(12) United States Patent
Jones et al.

(10) Patent No.: US 7,818,217 B2
(45) Date of Patent: Oct. 19, 2010

(54) METHOD OF CUSTOMIZING AN ARTICLE

(75) Inventors: David P. Jones, Beaverton, OR (US);
Bruce J. Kilgore, Lake Oswego, OR (US); Elizabeth Langvin, Tigard, OR (US); James C. Meschter, Portland, OR (US)

(73) Assignee: Nike, Inc., Beaverton, OR (US)

( * ) Notice: Subject to any disclaimer, the term of this patent is extended or adjusted under 35 U.S.C. 154(b) by 197 days.

(21) Appl. No.: 11/780,965

(22) Filed: Jul. 20, 2007

(65) Prior Publication Data

US 2009/0019648 A1 Jan. 22, 2009

(51) Int. Cl.
*G06Q 30/00* (2006.01)

(52) U.S. Cl. ........................................................ 705/26

(58) Field of Classification Search .................... 705/26, 705/27
See application file for complete search history.

(56) References Cited

U.S. PATENT DOCUMENTS

| | | | |
|---|---|---|---|
| 5,206,804 A | 4/1993 | Thies et al. | |
| 5,339,252 A * | 8/1994 | White et al. | 700/98 |
| 6,299,962 B1 | 10/2001 | Davis et al. | |
| 6,434,870 B1 | 8/2002 | Fanjoy | |
| 6,449,878 B1 | 9/2002 | Lyden | |
| 6,455,128 B1 * | 9/2002 | Moon | 428/138 |
| 6,533,885 B2 | 3/2003 | Davis et al. | |
| 6,601,042 B1 | 7/2003 | Lyden | |
| 6,859,679 B1 | 2/2005 | Smith et al. | |
| 6,874,256 B2 | 4/2005 | Delgatty | |
| 7,016,867 B2 | 3/2006 | Lyden | |
| 2003/0033207 A1 * | 2/2003 | Litke et al. | 705/26 |
| 2003/0069807 A1 | 4/2003 | Lyden | |
| 2004/0024645 A1 | 2/2004 | Potter et al. | |
| 2004/0194349 A1 * | 10/2004 | Delgatty | 36/101 |
| 2005/0071242 A1 | 3/2005 | Allen et al. | |
| 2005/0131571 A1 | 6/2005 | Costin | |
| 2005/0251462 A1 | 11/2005 | Nykamp | |
| 2005/0289018 A1 * | 12/2005 | Sullivan et al. | 705/27 |
| 2006/0184418 A1 * | 8/2006 | Connolly et al. | 705/14 |
| 2007/0123391 A1 | 5/2007 | Shin et al. | |
| 2007/0130805 A1 | 6/2007 | Brady et al. | |
| 2008/0010867 A1 * | 1/2008 | Davis | 36/136 |

FOREIGN PATENT DOCUMENTS

| | | |
|---|---|---|
| JP | 9299107 | 11/1997 |
| JP | 2003108795 | 4/2003 |
| WO | WO 00/36943 | 6/2000 |

OTHER PUBLICATIONS

Author unknown, "zephwear.com Introduces Logo-it Technology for Sport Shoe," PR Newswire, Mar. 13, 2001.*
International Preliminary Report on Patentability mailed Feb. 4, 2010 from PCT U.S. Appl. No. PCT/US2008/070214.
International Search Report, mailed Oct. 22, 2008, from PCT U.S. Appl. No. PCT/US2008/070214.

* cited by examiner

*Primary Examiner*—Amee A Shah
*Assistant Examiner*—Brandy Zukanovich
(74) *Attorney, Agent, or Firm*—Plumsea Law Group, LLC

(57) ABSTRACT

A method of post customization for articles of footwear is disclosed. The method includes a step of receiving an order for a plurality of pairs of footwear, a step of manufacturing the articles, a step of receiving a set of post customization designs and a step of applying post customization designs to the articles of footwear.

23 Claims, 9 Drawing Sheets

METHOD OF CUSTOMIZING AN ARTICLE

BACKGROUND OF THE INVENTION

1. Field of the Invention

The present invention relates generally to a method of manufacturing an article, and in particular to a method for manufacturing an article of footwear with a post customization design.

2. Description of Related Art

Methods for applying designs to articles of footwear have been previously proposed. Yoshio (Japanese patent number JP9299107A) is directed at a method for producing a leather shoe. Yoshio teaches the use of a hot-melt resin that is applied to the inner surface of the instep material of a shoe, when the instep material is still divided into parts just after it has been cut out. Following this step, a reinforcing cloth is stuck on that inner surface to prevent the hot-melt resin from peeling off. The instep material is then processed to be a pre-finished shoe. Finally, characters and symbols may be embossed on the outer surface of the pre-finished shoe by a heating/pressing embosser.

Delgatty (U.S. Pat. No. 6,874,256) is directed at a shoe with a removable vamp. Delgatty teaches a shoe construction including a removable vamp. Delgatty further teaches the use of a customizing kit that may be provided to permit a consumer to customize the vamp, for example, by applying a heat transfer image to the vamp. In the Delgatty design, an image or other design may be printed onto a transfer paper supplied in the customizing kit. The user may remove the vamp portion of the shoe, flatten it, and apply the image to the vamp using the transfer paper and heat.

Although the prior art includes methods for applying designs to shoes after they have been manufactured, there are several drawbacks. The prior art does not teach methods for applying post customization designs to a set of two or more articles of footwear as accomplished by the manufacturer. Furthermore, the prior art only allows for designs on specialized portions of articles of footwear, rather than anywhere along the upper. There is a need in the art for a method of post customization that solves these problems.

SUMMARY OF THE INVENTION

A method for applying post customization designs to footwear is disclosed. In one aspect, the invention provides a method for manufacturing articles of footwear with post customization designs, comprising the steps of: receiving a first order for a plurality of pairs of footwear; manufacturing the plurality of pairs of footwear according to the first order; receiving a second order for a set of post customization designs associated with the plurality of pairs of footwear; applying the post customization designs to the plurality of pairs of footwear according to the second order; shipping the plurality of pairs of footwear including post customization designs to a pre-designated address; and where the second order is received after the first order.

In another aspect, the first order is received by mail.

In another aspect, the first order is received using the Internet.

In another aspect, the first order is received from a retail store.

In another aspect, the second order is received by mail.

In another aspect, the second order is received using the Internet.

In another aspect, the second order is received from a retail store.

In another aspect, the first order for the plurality of pairs of footwear includes customer designed uppers.

In another aspect, the set of post customization designs includes a set of numbers.

In another aspect, the set of post customization designs includes a set of names.

In another aspect, the invention provides a method for manufacturing articles of footwear with post customization designs, comprising the steps of: receiving a first order for a plurality of pairs of footwear; manufacturing the plurality of pairs of footwear according to the first order; receiving a second order for a set of post customization designs associated with the plurality of footwear; printing the set of post customization designs onto a set of transfer films; and applying the set of transfer films to portions of each of the pairs of footwear.

In another aspect, the transfer films are applied to each pair of footwear using heat.

In another aspect, the second order is received after the first order.

In another aspect, the first order for the plurality of pairs of footwear includes digitally printed uppers.

In another aspect, the invention provides a method of ordering multiple pairs of footwear with post customization designs, comprising the steps of: selecting a plurality of pairs of footwear; selecting a set of post customization designs; submitting the set of post customization designs; and receiving a plurality of pairs of customized footwear wherein the customized footwear comprises the selected plurality of pairs of footwear including the selected set of post customization designs.

In another aspect, the selected set of post customization designs includes a first post customization design and a second post customization design.

In another aspect, the first post customization design is distinct from the second post customization design.

In another aspect, the set of post customization designs includes a set of distinct numbers.

In another aspect, the set of post customization designs includes a set of distinct names.

In another aspect, the step of ordering the plurality of pairs of footwear includes a set of distinct letters.

Other systems, methods, features and advantages of the invention will be, or will become apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
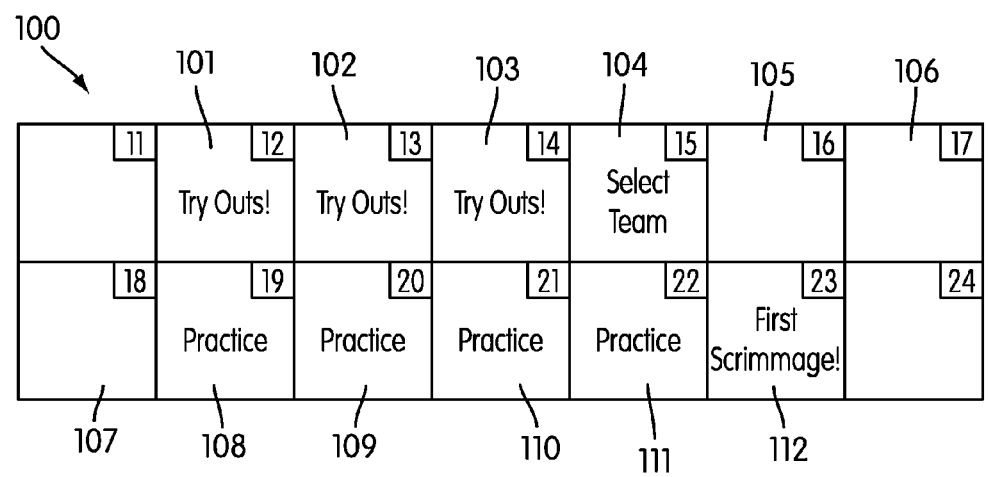
FIG. 1 is a preferred embodiment of a portion of a calendar.

FIG. 1 is a schematic diagram of an illustrative embodiment of calendar portion 100. Calendar portion 100 is preferably a two week period of a month, including all of the dates between the $11^{th}$ and the $24^{th}$ of the month. In some embodiments, calendar portion 100 may be used by a coach or an assistant coach for a sports team. For example, as seen in the current embodiment, calendar portion 100 may be used to indicate the pre-season schedule for a particular sport.

Often, pre-season for a sports team begins with several days of try outs, when athletes attempt to get selected for a team or 'make the cut'. In the current embodiment, first date 101, second date 102 and third date 103 are associated with the $12^{th}$, $13^{th}$, and $14^{th}$ dates of the month. Preferably, "try outs" have been schedule for dates 101-103. This embodiment is only intended to be an example and in other embodiments the length of the try out period may be shorter or longer than three days. In some cases, the length of the try out period may be sports dependent.

Once try outs have been completed, a coach, often with the assistance of several assistant coaches, may decide on the final team, based on the performance of the athletes during the try out period. Fourth date 104 is associated with the $15^{th}$ day of the month, and as indicated in the current embodiment, fourth date 104 is the day when the team is selected.

In some cases, there is little time between the date when the team is selected, and the date when the team participates in the first scrimmage, exhibition or pre-season game. For example, in the current embodiment, fifth date 105, sixth date 106, seventh date 107, eighth date 108, ninth date 109, tenth date 110 and eleventh date 111 are the seven dates between fourth date 104, when the team is selected, and twelfth date 112, when the first scrimmage begins. In the current embodiment, some of these days, in particular dates 108-110, are practice days. This type of short pre-season schedule may be common in middle and high school sports where there is less time allowed for a season as compared to professional or college sports that include longer pre-seasons.

In some cases, a coach may wish to have particular customized designs, such as names, numbers or various other designs, applied to articles of footwear before the first scrimmage, exhibition or pre-season game begins. Given the relatively short turn-around time of as little as a week between the date the team is selected and the first scrimmage, this type of footwear customization may be difficult, especially when applying numbers, names or other personalized information that may not be available to the coach until the final team has been selected. Although the total number of footwear, type of footwear and even size distributions may be selected and ordered well in advance of the pre-season, last minute customizations must be made with a short turn-around time.

Preferably, a method for manufacturing articles of footwear may include provisions for applying customized designs to a set of two or more pairs of footwear with a short turn-around time. These customized designs, which may be added quickly to a plurality of articles of footwear, once the articles of footwear have been manufactured, are referred to here and throughout the rest of this detailed discussion and claims as 'post customization designs', since they are applied after the articles of footwear have been manufactured. Furthermore, a method for applying such designs may be referred to as a 'post customization method'.

It should be understood that calendar portion 100 is only intended to be an example of a part of a pre-season schedule for a sports team. In other embodiments, the pre-season schedule could be any length, including less than two weeks or more than two weeks. Additionally, the month is generic in the current embodiment, though generally calendar portion 100 could be a part of any month or a plurality of months, and include any dates.

For clarity, the following detailed description refers to a post customization method as applied to articles of footwear intended to be worn by a basketball team. In other embodiments, however, this post customization method could be used for any sport or other purpose, to create post customization designs for any type of footwear. Examples of sports footwear that this post customization method could be used with include football cleats, soccer shoes, baseball cleats, tennis shoes, rugby cleats, ice skates, as well as other types of sports footwear. Furthermore, the use of this post customization method is not limited to sports shoes. Generally, this post customization method for footwear could be used in any situation where post customization designs may be applied to a set of two or more pairs of footwear. The use of this post customization method allows for personalization of footwear to be used in any group sport or other type of activity, for purposes of identification, to show team unity, or for other purposes. Additionally, features and principles of the customization method can be applied to other kinds of items as well, including, but not limited to bags, purses, packs, luggage, travel gear, sporting equipment, accessories and packaging.

Figure 2:
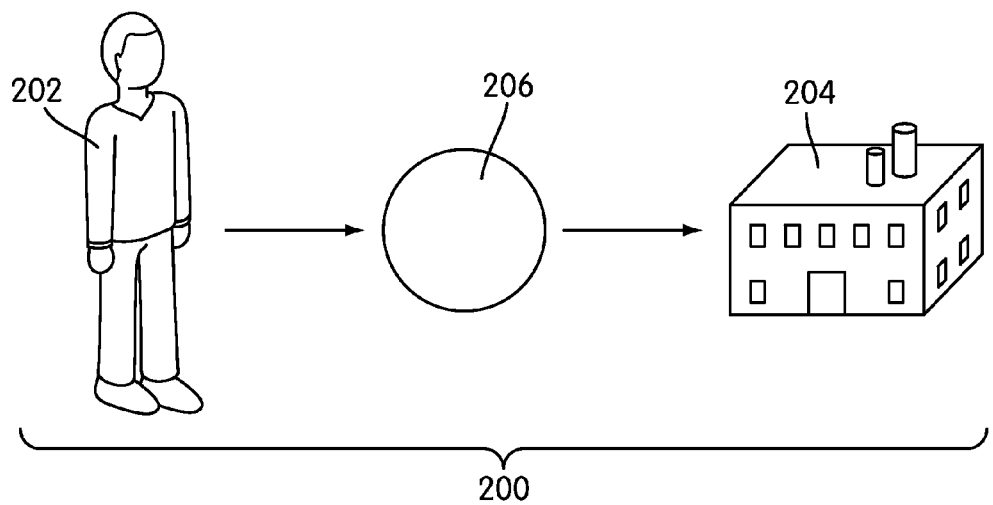
FIG. 2 is a preferred embodiment of a post customization system.

FIG. 2 is a preferred embodiment of post customization system 200. Post customization system 200 preferably includes customer 202 in communication with factory 204 via communication system 206. Communication system 206 may be any type of communication system configured to relay information between customer 202 and factory 204. Communication system 206 may incorporate the Internet, telephones, fax machines, mail as well as any other method for transferring information between customer 202 and factory 204.

In this embodiment, factory 204 represents a manufacturing system configured to manufacture articles of footwear. In the current embodiment, factory 204 is shown as a single building for illustrative purposes only. In many cases, factory 204 will comprise many buildings. In some cases, factory 204 may comprise many buildings that are disposed in different geographic locations. Generally, the term factory, as used here, may also refer to distributors and/or suppliers. In other words, the term factory may also apply to various operations on the manufacturing side, including the operations responsible for parts, labor, and/or retail of the article of footwear, as well as other manufacturing side operations.

Customer 202 may be any person acting on behalf of the sports team or other group needing customized footwear. For example, customer 202 could be a coach, an athlete, an assistant coach, an administrative assistant, a parent, a student, or another party. In this preferred embodiment customer 202 is a coach.

Figure 3:
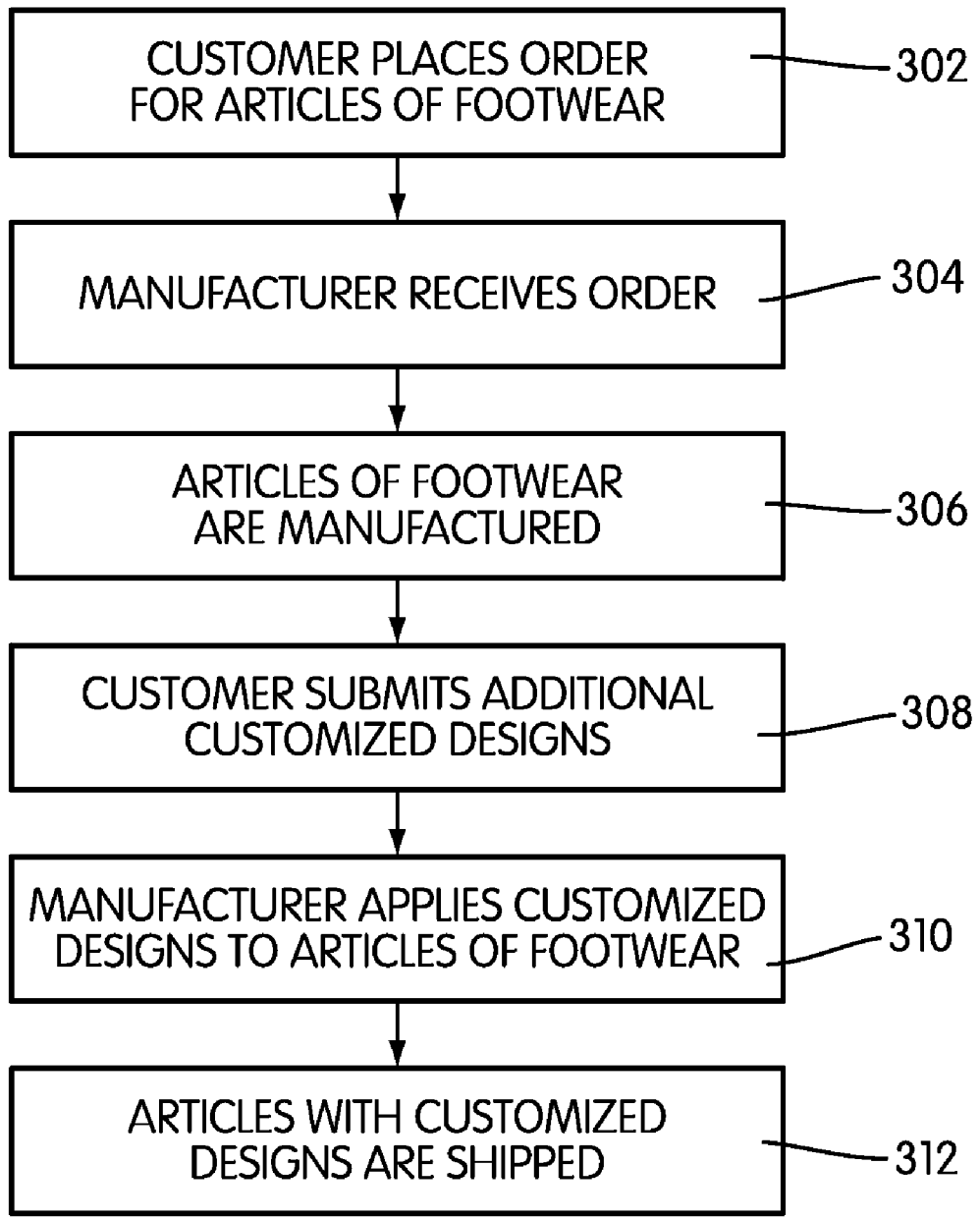
FIG. 3 is a preferred embodiment of a method for manufacturing articles of footwear with post customization designs.

FIG. 3 is an overview of a preferred embodiment of a method of post customization. The following steps may used in conjunction with a post customization system 200. Preferably, during a first step 302, customer 202 may place an order for multiple articles of footwear. In some cases, this may be done in advance of the pre-season. Following this, during a second step 304, the manufacturer may receive the order at factory 204. During a third step 306, the articles of footwear may be manufactured according to the customer's order. During a fourth step 308, the customer may submit post customization designs to factory 204, using communication system 206. This may be done just after the members of a sports team have been selected, for example. Then, during a fifth step 310, the manufacturer may apply the post customization designs to the articles of footwear. Finally, during a sixth and final step 312, the articles including post customization designs may be shipped to a pre-designated address.

Figure 4:
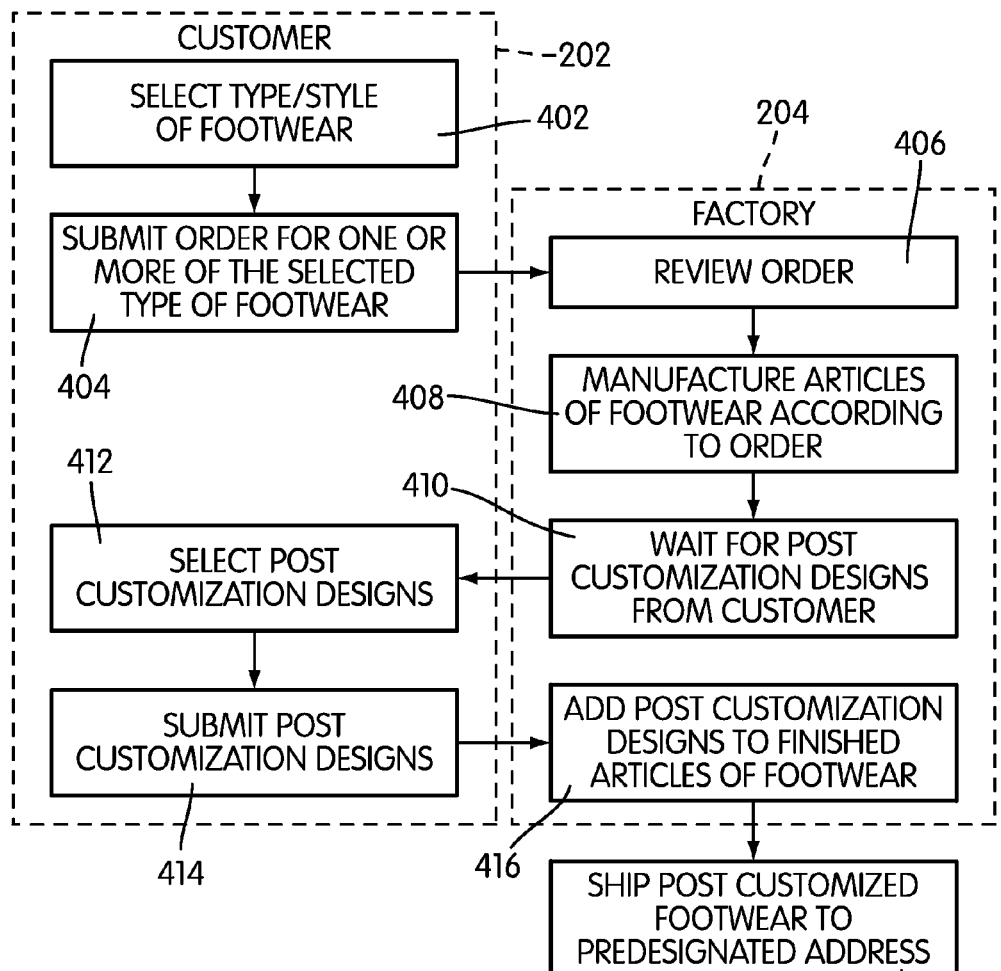
FIG. 4 is a preferred embodiment of a detailed method for a post customization system.

Referring to FIG. 4, the preferred embodiment of post customization system 200 may be best understood by separating the steps associated with customer 202 and those associated with factory 204. Preferably, those steps associated with customer 202 are by customer 202 and those steps associated with factory 204 are performed on or by factory 204. However, this is not necessarily the case, and some of the steps associated with customer 202 may be performed on or by factory 204 or some other resource, and some of the steps associated with factory 204 may be performed on or by customer 202 or some other resource.

In first step 402, customer 202 may select a type of footwear. During this step, customer 202 may choose a type of shoe according to the sport. For example, if the team sport is basketball, customer 202 will preferably choose a type of basketball shoe. The customer may also make the selection according to additional preferences, including various colors, as well as structural features. Following this step, during step 404, customer 202 may submit an order for multiple articles of footwear according to the type they have chosen. During this step, customer 202 may select a distribution of sizes to be included with the order. The order may be submitted using a computer via the Internet, fax, through a mail-in form, or by visiting a retail store that can submit orders to the manufacturer at factory 204. Following this submission, factory 204 preferably receives and reviews order during step 406.

During step 408, the articles of footwear are preferably manufactured at factory 204 according to the order received from customer 202. In other embodiments, the articles of footwear are pre-made and shipped to factory 204 or simply stored at factory 204. At this point, during step 410, the manufacturer may wait for further information from customer 202 regarding post customization designs for the articles of footwear.

At a later point, during step 412 and step 414, customer 202 may select and submit post customization designs to factory 204. In some embodiments, the post customization designs may be selected from a list of designs made available from the manufacturer at factory 204. In other embodiments, the post customization designs may be supplied by a third party. In a preferred embodiment, customer 202 may design the post customization designs using a design system provided by factory 204.

Once the post customization designs have been received at factory 204, during step 416, the manufacturer preferably adds the post customization designs to the articles of footwear that have been manufactured during previous step 408. Finally, during a final step 418, the articles of footwear including post customization designs are preferably shipped to a pre-designated shipping address that is supplied by customer 202.

Figure 5:
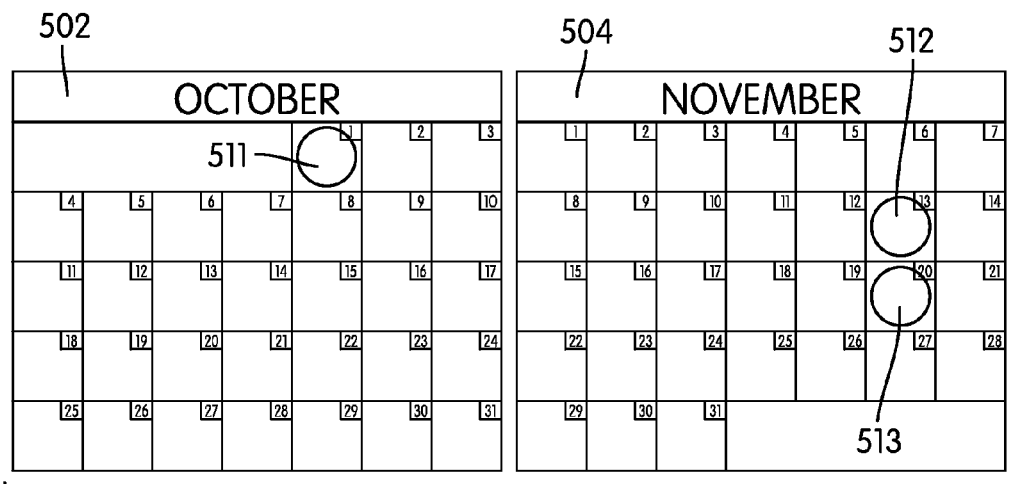
FIG. 5 is a preferred embodiment of a portion of a calendar.

FIG. 5 is a preferred embodiment of first month 502 and second month 504 of a calendar intended to illustrate a possible timeframe for the post customization method discussed in FIGS. 3 and 4. In the current embodiment, first date 511 is the date when customer 202 places a first order for multiple articles of footwear. In the current embodiment, customer 202 presumably submits an order according to a pre-determined number of athletes on a basketball team. Once the team is selected a month and a half later, on second date 512, customer 202 may again submit information regarding post customization designs. For example, once the team is selected, the athletes' numbers may be selected, and these numbers may be submitted to the manufacturer. Preferably, during the month and a half between first date 511 and second date 512, factory 204 may produce the articles of footwear. Once the post customization designs have been submitted, in this case the athletes' numbers, the manufacturer may proceed to apply the post customization designs immediately and then ship the articles of footwear to customer 202 (or a third party address). This may allow the articles of footwear to be received in enough time for a scrimmage or pre-season game that has been scheduled on third date 513. This method of post customization is advantageous over previous designs where the customer can only submit a single order for articles of footwear and customized designs, which may increase turnaround times for receiving the articles of footwear.

It should be understood that the time frames discussed with respect to the current embodiments are only intended to be exemplary. In the current embodiment, first month 502 is the month of October and second month 504 is the month of November. However, in other embodiments, months 502 and 504 could be any months, including more or less than two months. Generally, the time necessary for manufacturing the articles of footwear and the time needed to apply post customization designs and ship articles of footwear may vary.

Figure 6:
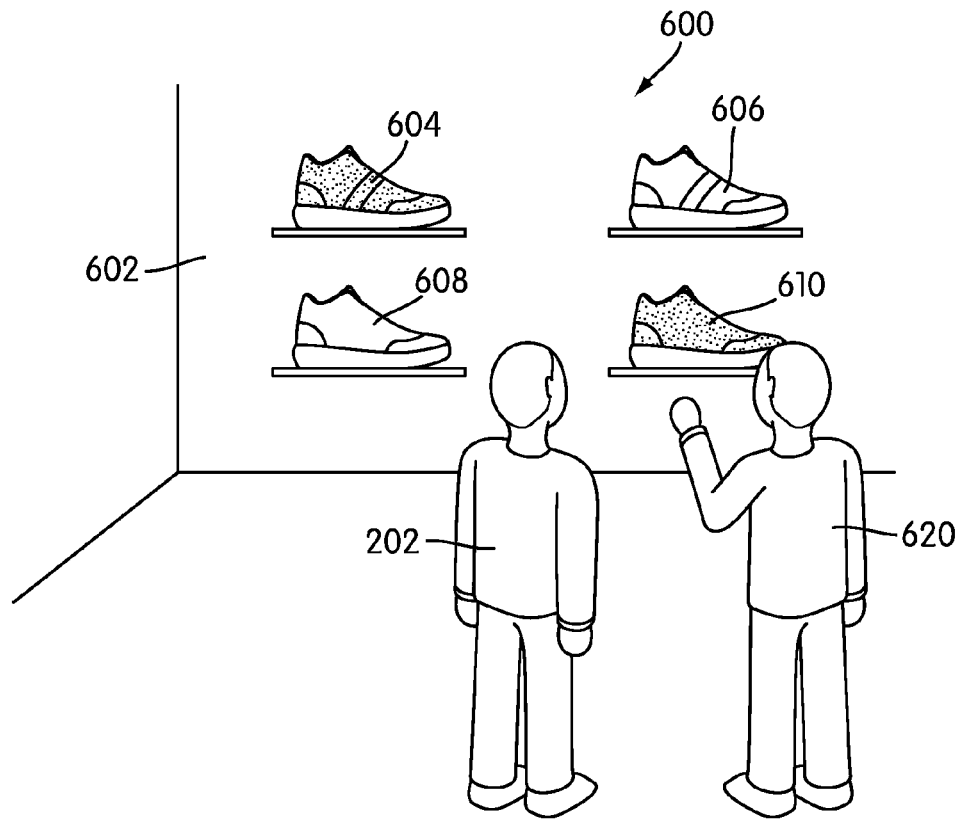
FIG. 6 is a preferred embodiment of a retail store.

The following description discusses the details of the steps outlined and briefly described with reference to FIGS. 2-3. Referring to FIG. 6, in some embodiments, customer 202 may travel to retail store 600 in order to select a type of footwear and place an order or multiple articles of footwear. In the current embodiment, customer 202 may select an article of footwear from wall display 602 of retail store 600. Wall display 602 includes first article of footwear 604, second article of footwear 606, third article of footwear 608 and fourth article of footwear 610. Customer 202 may select one of these articles of footwear 604, 606, 608 and 610 according to preferences of footwear type, color as well as other features.

In some cases, customer 202 may talk with employee 620 of retail store 600 in order to select a custom designed article of footwear. For example, employee 620 may provide customer 202 with color swatches, fabric styles, as well as other possible footwear characteristics that customer 202 may select in order to build a customized article of footwear.

Figure 7:
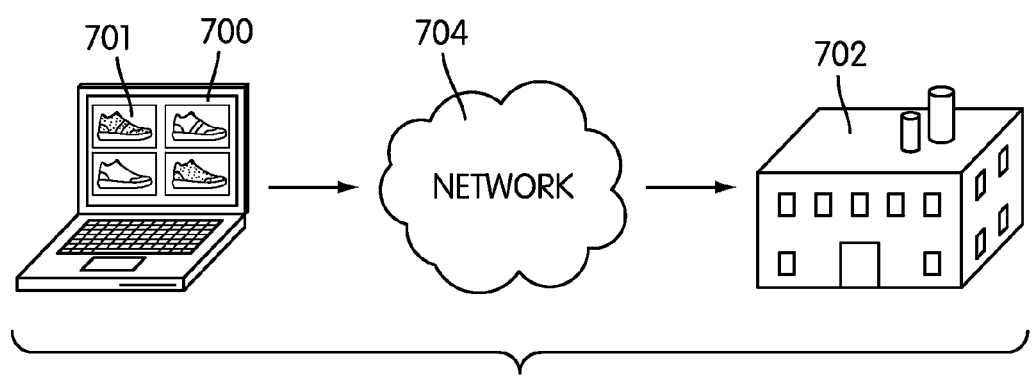
FIG. 7 is a preferred embodiment of a system for ordering footwear online.

Referring to FIG. 7, in another embodiment, customer 202 may select an article of footwear using a website supplied by the manufacturer or a third party. Preferably, customer 202 has access to remote terminal 700. Generally, remote terminal 700 may be any type of computer, including either a desktop or a laptop computer. In other embodiments, remote terminal 700 may be any type of device that includes a display, a processor, and the ability to transmit and receive data from a remote network. Examples of such devices include, but are not limited to, PDA's, cell phones, as well as other types of devices.

Using remote terminal 700, customer 202 may gain access to a website supplied by the manufacturer or a third party. In a preferred embodiment, the website may be used to select an article of footwear. For example, in the embodiment seen in FIG. 7, customer 202 may select from articles of footwear 701 similar to articles of footwear 604, 606, 608 and 610.

In the current embodiment, network 704 is configured to relay information between remote terminal 700 and factory 702. Generally, network 704 may be a system allowing for the exchange of information between remote terminal 700 and factory 704. Examples of such networks include, but are not limited to, personal area networks, local area networks, wide area networks, client-server networks, peer-to-peer networks, as well as other types of networks. Additionally, the network may support wired transmissions, wireless transmissions, or both wired and wireless transmissions. In some embodiments, network 704 may be a packet-switched communications system. In a preferred embodiment, network 704 may be the Internet.

In some embodiments, customer 202 may make use of a digital printing system to design the entire article of footwear, or a portion, such as the upper. Digital printing systems may include a graphical interface system provided via a website that allows the customer to design an article of footwear using various graphics tools. In a preferred embodiment, the digital printing system disclosed in commonly owned U.S. patent application Ser. No. 11/612,320, filed Dec. 18, 2006, published as U.S. patent publication number 2008/0147219, the entirety of which is incorporated herein by reference, may be used.

Figures 8, 9:
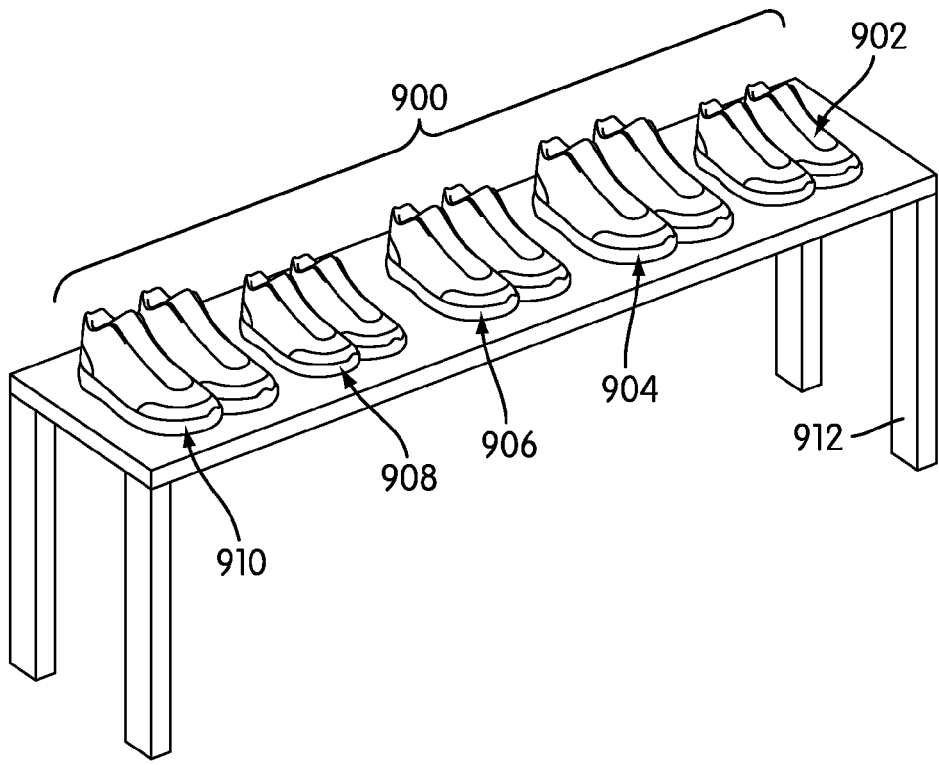
FIG. 8 is a preferred embodiment of an order form.
FIG. 9 is a preferred embodiment of a plurality of articles of footwear.

Referring to FIG. 8, once the preferred type of article of footwear has been selected, customer 202 preferably fills out order form 800. In some cases, customer 202 may select more than one type of footwear. Order form 800 may be a written form that is obtained from a retail store, by way of mail, or printed from a website. In some embodiments, order form 800 may be an online form that can be filled out and submitted using a website. Preferably, order form includes first portion 802 for customer 202 to list the desired type of footwear; second portion 804 for customer 202 to list the total number of shoes to be manufactured; third portion 806 for customer 202 to list the number of shoes per shoe size; and fourth portion 808 for customer 202 to list the number of shoes per shoe color. In some embodiments, order form 800 may include fifth portion 810 where a customer can state whether or not they want post customization.

In the current embodiment, some examples of various shoe size options and shoe color options are given, however these are only meant to be exemplary. Additionally, order form 800 could also include portions for customer 202 to list additional information related to the articles of footwear to be manufactured. Also, in some embodiments, customer 202 may choose to have identical shoes, except for the shoe sizes, as well as post customization designs to be added at a later time. Although customer 202 may not know exactly what sizes to order ahead of time, in many cases a pre-determined statistical distribution can be used to order the correct number of shoes for each size.

Although the preferred embodiment includes provisions for transferring information between a customer and the manufacturer using the Internet or through a retail store, in other embodiments, information may be transferred between the customer and the manufacturer using other provisions. In some cases, for example, information may be exchanged via mail, fax, courier, as well as other forms of communication.

Referring to FIG. 9, multiple articles of footwear may be manufactured at factory 204 according to order form 800 as filled out by customer 202. Preferably, set of footwear 900 preferably includes a plurality of pairs of footwear. In the current embodiment, set of footwear 900 includes first pair of footwear 902, second pair of footwear 904, third pair of footwear 906, fourth pair of footwear 908 and fifth pair of footwear 910. Although the current embodiment includes five pairs of footwear, in other embodiments, set of footwear 900 may include more or less than five pairs of footwear.

It is clear from FIG. 9 that no post customization designs have been applied to set of footwear 900 following this initial manufacturing step. Instead, set of footwear 900 is temporarily stored on bench 912 until post customization designs have been received from customer 202. In this preferred embodiment, pairs of footwear 902, 904, 906, 908 and 910 are substantially similar except for their sizes, which are different. In other embodiments, each pair of footwear comprising set of footwear 900 may be distinct in color and/or design.

FIGS. 10-17 are intended to illustrate a preferred embodiment of the use of a post customization system to apply post customization designs to a set of articles of footwear. For clarity, the current embodiment includes post customization designs in the form of customized numbers, however in other embodiments, other types of designs could be submitted as post customization designs. For example, post customization designs could include player names, player number, team names, school names, logos, mottos, words or phrases, images, as well as other personalized designs, including letters or initials. In some embodiments, images or other personalized designs could be uploaded to a website associated with factory 204, mailed in to factory 204, faxed to factory 204, presented to a retail store, or otherwise submitted to factory 204. In other embodiments, customer 202 could use the customization system associated with designing footwear uppers that was discussed previously to create and submit post customization designs.

Figure 10:
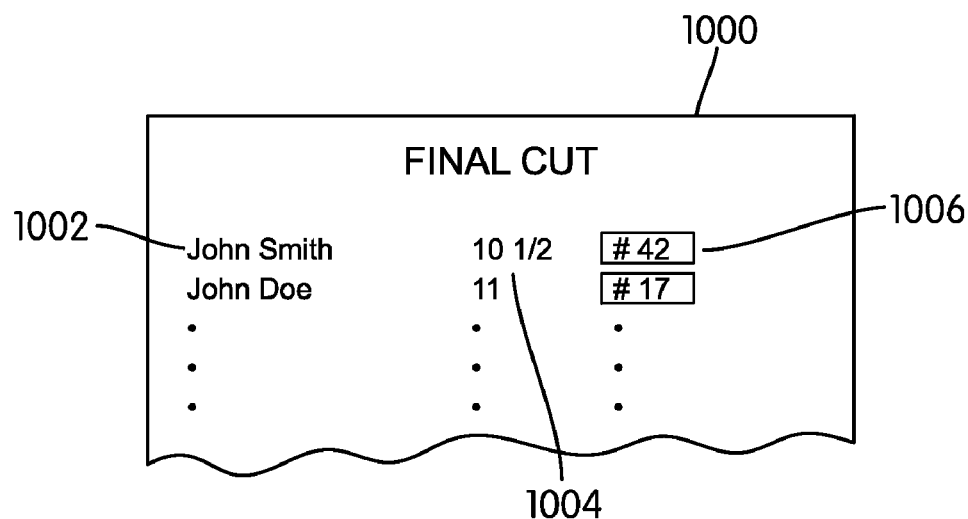
FIG. 10 is a preferred embodiment of a final cut list.
Figure 11:
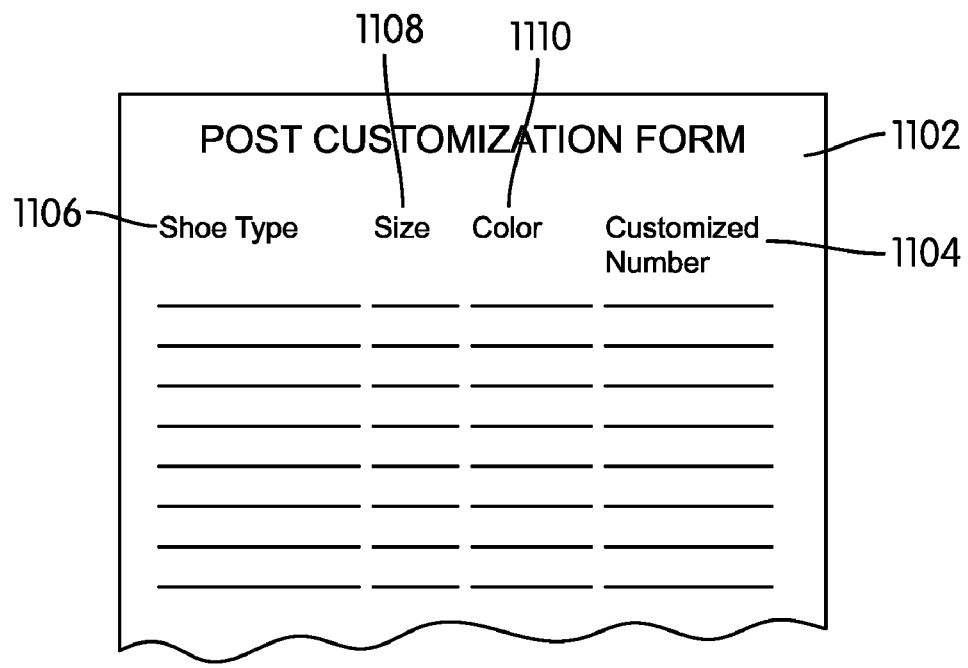
FIG. 11 is a preferred embodiment of a post customization order form.
Figure 12:
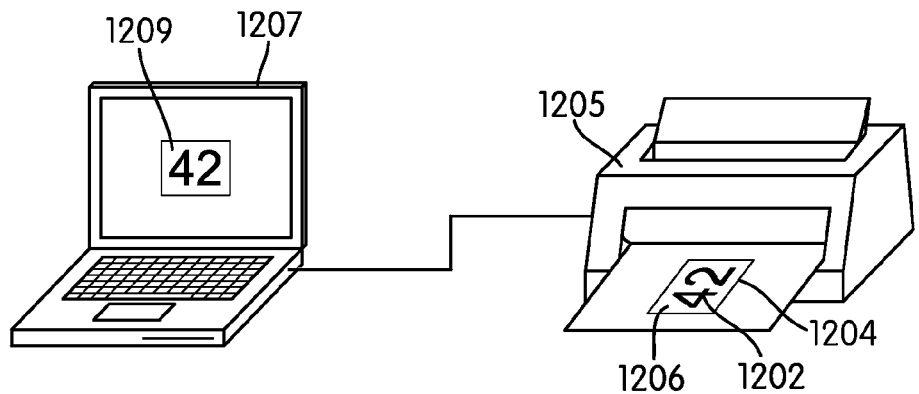
FIG. 12 is a preferred embodiment of a system for printing post customization designs to a transfer film.

FIG. 10 is an exemplary embodiment of final cut list 1000, used by a coach or an assistant coach. Final cut list 1000 includes names 1002, shoes sizes 1004 and team numbers 1006. Team numbers 1006 may generally be assigned once the team has been selected. Once team numbers 1006 are known for each team member, customer 202 may fill out post customization form 1102. Preferably, customer 202 uses customization form 1102 to associate customized numbers 1104 with specific shoes that have been pre-ordered and pre-manufactured at factory 204. Each shoe may be identified by specifying shoe type 1106, shoe size 1108 and shoe color 1110. In other embodiments, post customization form 1102 may include other characteristics associated with a pre-manufactured article of footwear so that customer 202 may specify which of the pre-manufactured articles of footwear should be associated with each customized number 1104.

Generally, post customization form 1102 may be a paper form that is mailed in, faxed or submitted to a retail store, or an on-line form submitted using a website associated with factory 204. In some embodiments, customer 202 could call a retailer or factory 204 using communication system 206 (see FIG. 2) and submit customized numbers 1104 over the phone.

Referring to FIGS. 12-15, in some embodiments a post customization design could be applied to an article of footwear using a heat transfer film method. In the embodiment shown in FIG. 12, post customization design 1202 may be printed onto film 1204 using printer 1205. In some embodiments, film 1204 may be a thin layer of polyurethane. In other embodiments, film 1204 may be a material containing polyester.

Printer 1205 may be any type of printer including a laser printer, an ink jet printer, as well as any other type of printer. Preferably, printer 1205 may be connected to computer 1207 including image 1209 of one of the post customization designs submitted by customer 202. Image 1209 may be automatically generated using computer 1207 for each customized number submitted by customer 202. In some cases, customer 202 may specify a font type and/or font size. In other embodiments, the font type and font size may be predesignated by the manufacturer at factory 204.

Figure 13:
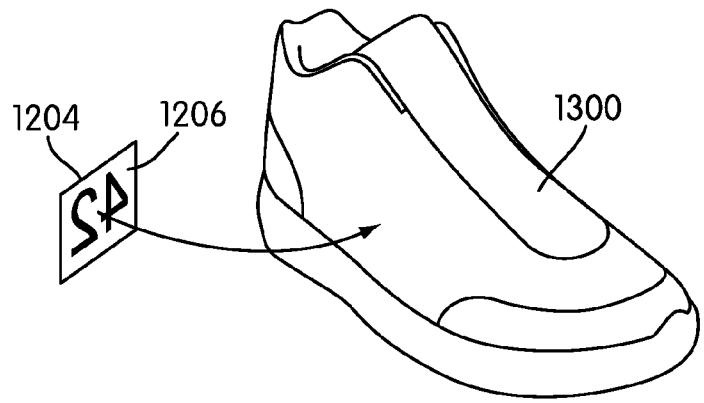
FIG. 13 is a preferred embodiment of a transfer film being associated with an article of footwear.

Preferably, post customization design 1202 may be printed in reverse on a printed side 1206 of film 1204. Printed side 1206 can then be associated with article of footwear 1300, as shown in FIG. 13. Printing in reverse on printed side 1206 allows the correct image of the post customization design to appear when film 1204 is flipped so that printed side 1206 confronts article of footwear 1300, as seen in the Figures.

Figure 14:
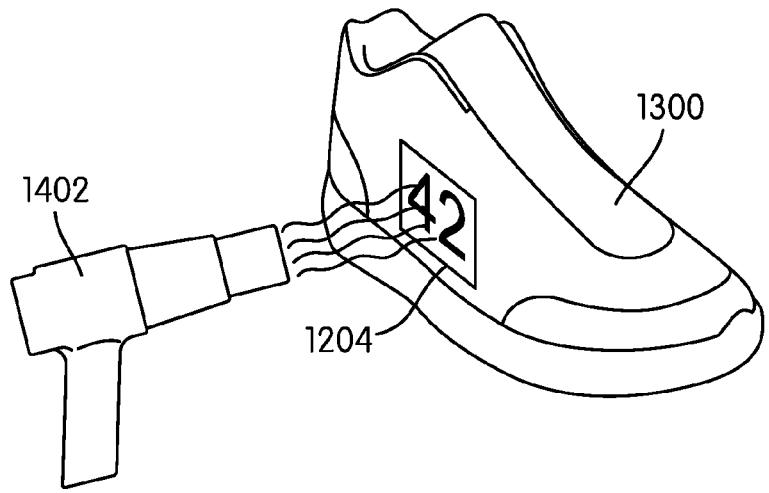
FIG. 14 is a preferred embodiment of a transfer film being applied to an article of footwear.

Once film 1204 has been associated with article of footwear 1300, heat may be applied to film 1204, as seen in FIG. 14. In one embodiment, heat is applied using industrial heat gun 1402, however, any heat source may be used. In other embodiments, heat may be applied to film 1204 using another method. Additionally, in some embodiments, heat and pressure may be used. In another embodiment, only pressure may be used.

Figure 15:
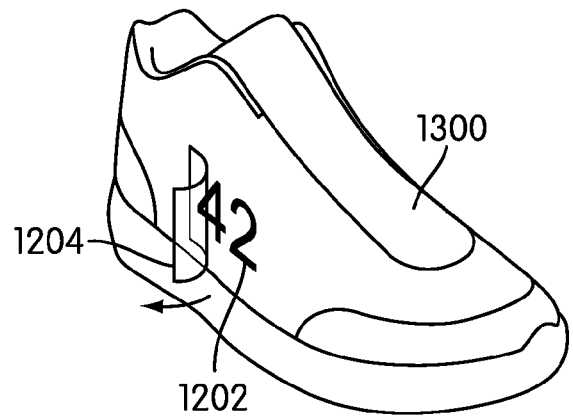
FIG. 15 is a preferred embodiment of an article of footwear after a post customization design has been applied.

Finally, transfer film 1204 may be removed from article of footwear 1300, as seen in FIG. 15. Preferably, post customization design 1202 has adhered to article of footwear 1300. In some embodiments, this process could be repeated to apply multiple post customization designs to the same article of footwear, including post customization designs applied to the opposing side of article of footwear 1300.

Figure 16:
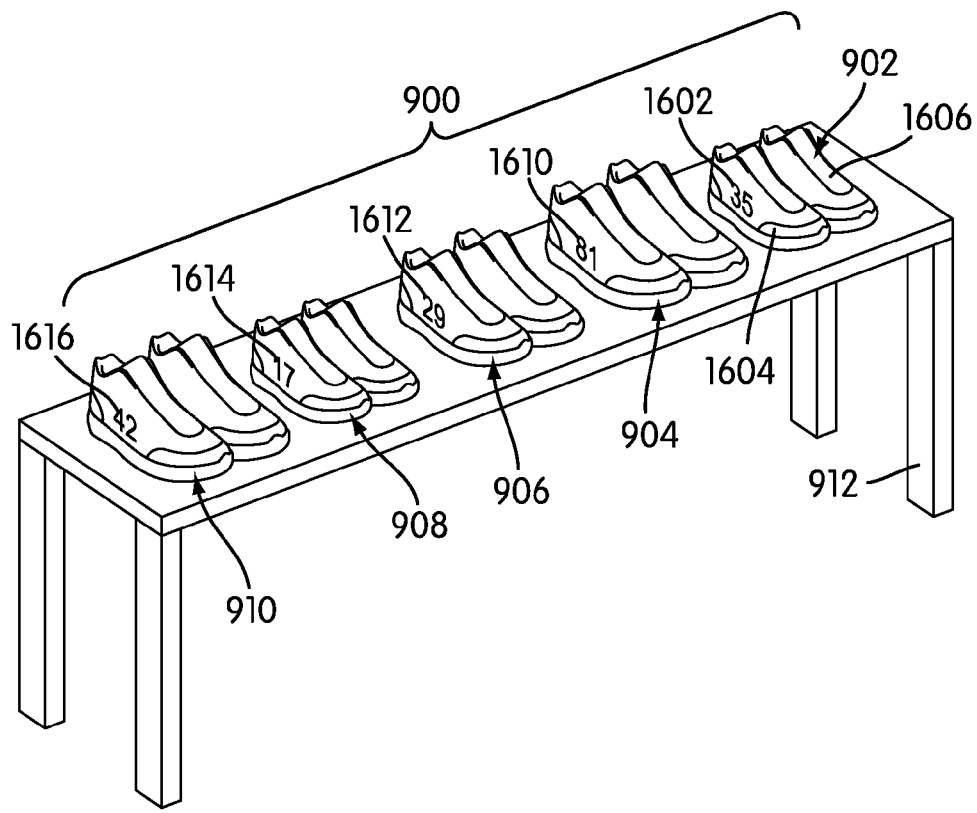
FIG. 16 is a preferred embodiment of a plurality of articles of footwear with post customization designs.

FIG. 16 is a preferred embodiment of set of footwear 900 following the application of post customization designs. Preferably, first pair of footwear 902 is associated with first customized design 1602. Although only a single post customization design is shown here associated with first article 1604 of first pair of footwear 902, in some embodiments first customized design 1602 may also be applied to second article 1606. In a similar manner, second pair of footwear 904, third pair of footwear 906, fourth pair of footwear 908 and fifth pair of footwear 910 may be associated with second customized design 1610, third customized design 1612, fourth customized design 1614 and fifth customized design 1616, respectively. Using these post customization designs allows pairs of footwear 902, 904, 906, 908 and 910 to be distinguished from one another, as well as allowing pairs of footwear 902, 904, 906, 908 and 910 to match the uniforms worn by each player that may also include numbers.

Figure 17:
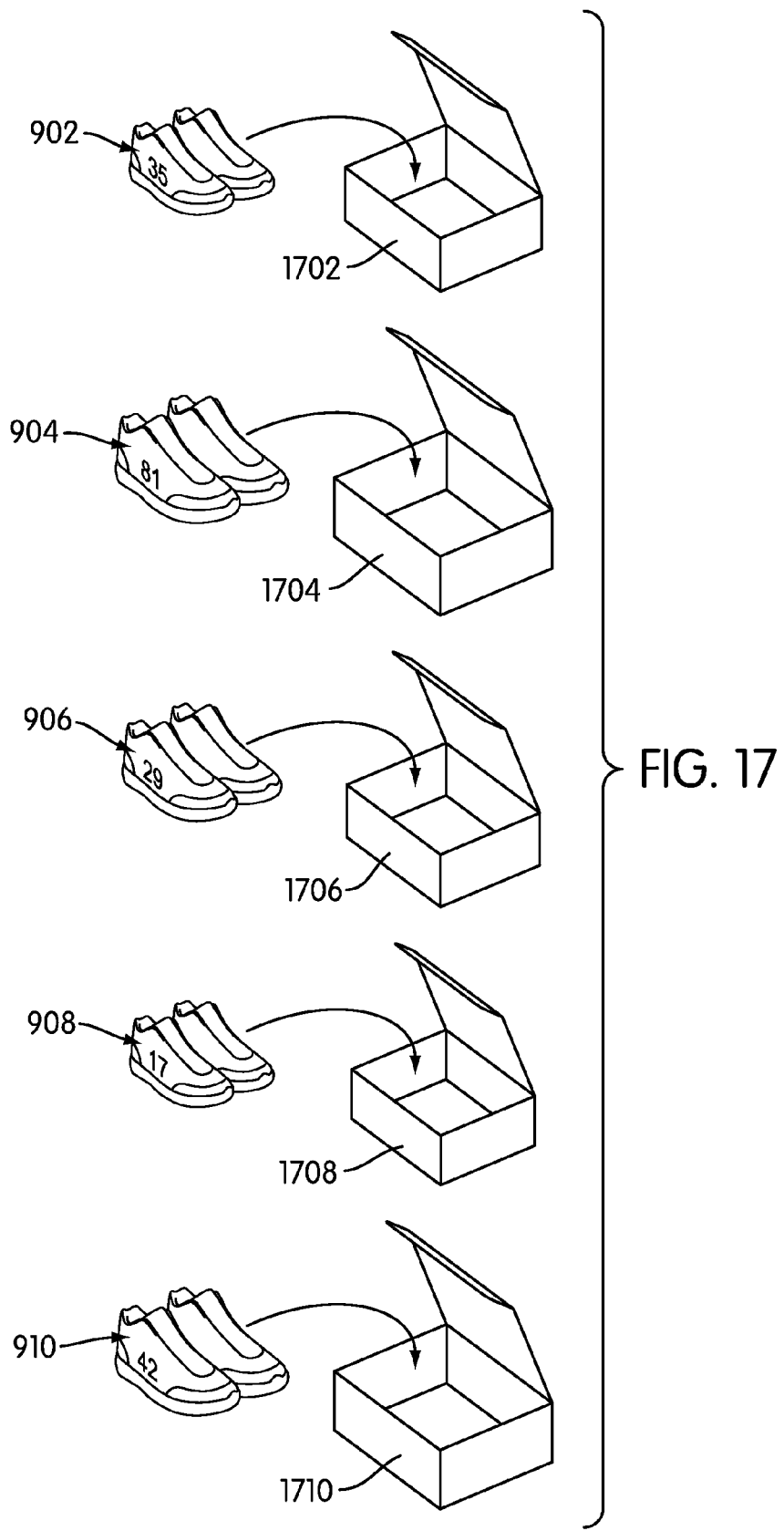
FIG. 17 is a preferred embodiment of a plurality of articles of footwear with post customization designs being shipped.

FIG. 17 is a preferred embodiment of set of footwear 902 being packed and shipped. In particular, first pair of footwear 902, second pair of footwear 904, third pair of footwear 906, fourth pair of footwear 908 and fifth pair of footwear 910 may be associated with first box 1702, second box 1704, third box 1706, fourth box 1708 and fifth box 1710, respectively. Following this, each of the boxes 1702, 1704, 1706, 1708 and 1710 may be shipped to one or more pre-designated addresses, as specified by customer 202.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for manufacturing articles of footwear with post customization designs, comprising the steps of:
   receiving via a computer a first order for a plurality of pairs of footwear;
   determining, for the first order, a set of pairs of footwear using a predetermined statistical distribution, wherein the predetermined statistical distribution determines a number of pairs of footwear for various different sizes;
   manufacturing the set of pairs of footwear according to the first order, wherein the number of pairs of footwear that are manufactured for each of the various different sizes is determined by the predetermined statistical distribution;
   receiving a second order for a set of post customization designs that are to be applied to the plurality of pairs of footwear of the first order;
   applying the post customization designs to the plurality of pairs of footwear according to the second order;
   shipping the plurality of pairs of footwear including post customization designs to a pre-designated address; and
   wherein the second order is received after the first order.

2. The method according to claim 1, wherein the first order is received using the Internet.

3. The method according to claim 1, wherein the first order is received from a retail store.

4. The method according to claim 1, wherein the second order is received using the Internet.

5. The method according to claim 1, wherein the second order is received by a retail store.

6. The method according to claim 1, wherein the first order for the plurality of pairs of footwear includes customer designed uppers.

7. The method according to claim 1, wherein the set of post customization designs includes a set of numbers.

8. The method according to claim 1, wherein the set of post customization designs includes a set of names.

9. The method according to claim 1, further comprising manufacturing the set of pairs of footwear after receiving the first order and before receiving the second order.

10. The method according to claim 1, wherein after manufacturing the set of pairs of footwear, the method further comprises temporarily storing the manufactured set of pairs of footwear before receiving the second order.

11. The method according to claim 1, wherein the first order is received on a first day and the second order is received on a second subsequent day.

12. A method for manufacturing articles of footwear with post customization designs, comprising the steps of:
   receiving via a computer a first order for a plurality of pairs of footwear;
   determining, for the first order, a set of pairs of footwear using a predetermined statistical distribution, wherein the predetermined statistical distribution determines a number of pairs of footwear for various different sizes;
   manufacturing the set of pairs of footwear according to the first order wherein the number of pairs of footwear that are manufactured for each of the various different sizes is determined by the predetermined statistical distribution;

receiving a second order for a set of post customization designs that are to be applied to the plurality of pairs of footwear of the first order;

printing the set of post customization designs onto a set of transfer films; and applying the set of transfer films to portions of each of the pairs of footwear.

13. The method according to claim 12, wherein the transfer films are applied to each pair of footwear using heat.

14. The method according to claim 12, wherein the first order for the plurality of pairs of footwear includes digitally printed uppers.

15. The method according to claim 12, further comprising manufacturing the set of pairs of footwear after receiving the first order and before receiving the second order.

16. The method according to claim 12, wherein after manufacturing the set of pairs of footwear, the method further comprises temporarily storing the manufactured set of pairs of footwear before receiving the second order.

17. A method of fulfilling an order for multiple pairs of footwear with post customization designs, the method comprising the steps of:

receiving via a computer a user selection for the multiple pairs of footwear for a first order;

determining, for the first order, a set of pairs of footwear using a predetermined statistical distribution, wherein the predetermined statistical distribution determines a number of pairs of footwear for various different sizes;

gathering the set of pairs of footwear for the first order, wherein the number of pairs of footwear that are gathered for each of the various different sizes is determined by the predetermined statistical distribution;

after gathering the set of pairs of footwear for the first order, receiving from the user a second order separate from the first order, wherein the second order comprises information related to a set of post customization designs to be applied to the multiple pairs of footwear of the first order;

wherein the set of post customization designs includes a unique design for each pair of footwear of the multiple pairs of footwear to produce a plurality of pairs of customized footwear; and wherein the plurality of pairs of customized footwear comprises the multiple of pairs of footwear that have been modified with the set of post customization designs.

18. The method according to claim 17, wherein the set of post customization designs includes a first post customization design and a second post customization design wherein the first post customization design is distinct from the second post customization design.

19. The method according to claim 17, wherein the plurality of pairs of customized footwear are collectively shipped to the user.

20. The method according to claim 17, wherein the set of post customization designs includes a set of distinct numbers, wherein each pair of the multiple pairs of footwear includes a number that is distinct from the remaining pairs of footwear.

21. The method according to claim 17, wherein the set of post customization designs includes a set of distinct names.

22. The method according to claim 17, wherein the set of post customization designs includes a set of distinct letters.

23. The method according to claim 17, further comprising gathering the set of pairs of footwear after receiving the first order and before receiving the second order.

* * * * *